March 27, 1956  P. F. LA VIGUEUR  2,739,633
TRACTION DEVICE FOR PNEUMATIC TIRE
Filed April 21, 1953
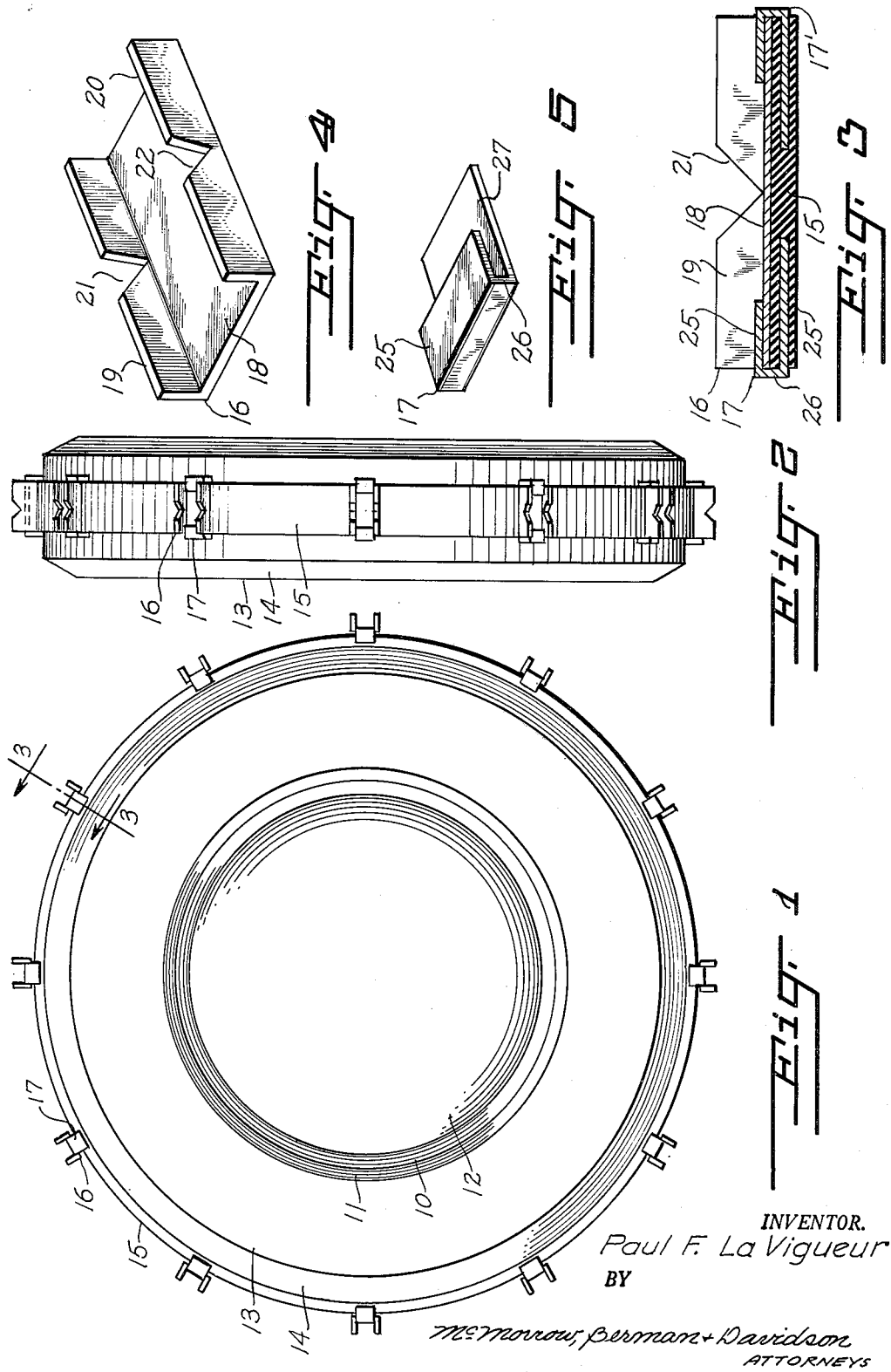
INVENTOR.
Paul F. La Vigueur
BY
McMorrow, Berman + Davidson
ATTORNEYS

United States Patent Office 2,739,633
Patented Mar. 27, 1956

2,739,633

TRACTION DEVICE FOR PNEUMATIC TIRE

Paul F. La Vigueur, Middleton, Mass.

Application April 21, 1953, Serial No. 350,001

2 Claims. (Cl. 152—222)

This invention relates to traction devices for pneumatic tires and more particularly to an annular traction device of elastic material carrying traction cleats on one side thereof and adapted to be stretched around the tread surface of an associated tire.

It is among the objects of the invention to provide an improved tire traction device which can be quickly and easily mounted on a pneumatic tire when driving conditions require special traction means, such as chains or cleats, and can be as quickly and easily removed from the associated tire when its use is no longer required; which includes a continuous elastic band that can be stretched over the tread surface of an associated tire and requires no fasteners or any special means for retaining the band on the tire; which includes cleats detachably mounted on the band at spaced apart locations thereound and projecting outwardly from the adjacent surface of the band; and which is simple and durable in construction, economical to manufacture, easy to apply and remove, and effective and efficient in use.

Other objects and advantages will become apparent from a consideration of the following description and the appended claims in conjunction with the accompanying drawing wherein:

Figure 1 is a side elevational view of a vehicle wheel and pneumatic tire assembly with a tire traction device illustrative of the invention mounted on the tread portion of the tire;

Figure 2 is an edge or tread elevational view of the assembly illustrated in Figure 1;

Figure 3 is a transverse cross sectional view of the traction device on an enlarged scale, taken on the line 3—3 of Figure 1;

Figure 4 is a perspective view of a cleat constituting an operative component of the traction device; and Figure 5 is a perspective view of a cleat holder also constituting an operative component of the device.

With continued reference to the drawing, the numeral 10 generally indicates a vehicle wheel having a surrounding tire rim 11 and a hub cap 12 covering the inner portion thereof and the numeral 13 designates a pneumatic tire mounted on the tire rim 11 and having a tread 14.

The illustrated tire traction device of the present invention comprises a flat band 15 of resilient and stretchable material, such as vulcanized rubber of suitable hardness, having any desired width not exceeding the width of the tread 14 of the tire 13 and an unstretched length slightly less than the circumference of the tread 14. The band 15 can be stretched onto the tread of a pneumatic tire of a size for which the traction device is designed and when so stretched onto the tire will embracingly engage and resiliently press against the tread of the tire so that the band will be held on the tread of the tire against accidental separation.

A plurality of cleats, as indicated 16, extends transversely of the outer surface of the band 15 at uniformly spaced apart locations around the band, and cleat holders 17 are secured on the band at respectively opposite edges of the band and engage the adjacent ends of the corresponding cleats to detachably secure the cleats to the band.

Each of the cleats 16, as particularly illustrated in Figure 4, is a channel shaped, metal structure having a length substantially equal to the width of the band 15 and includes a flat web portion 18 and flanges 19 and 20 extending one along each longitudinal edge of the web portion and extending perpendicularly from the same side of the web portion. The web portion has a width somewhat greater than the width of the flanges so that the cleats will not tend to turn or roll on the band 15 and the flanges are preferably provided at their mid length locations with V-shaped notches, as indicated at 21 and 22, to facilitate the clearing of material, such as snow or ice, from between the flanges of the cleats.

Each cleat 16 is detachably secured to the band 15 by a pair of cleat holders 17 with the outer side of its web portion 18 in contact with the outer side of the band and its flanges 19 and 20 extending outwardly from the outer surface of the band to provide traction cleats or ridges extending transversely of the band.

Each of the cleat holders 17, as illustrated in Figures 3 and 5, comprises a flat, hooked shaped body having one leg 27 of elongated, rectangular shape, a second leg 25, also of elongated, rectangular shape but shorter than the leg 27, disposed in spaced and substantially parallel relationship to the leg 27 with one end thereof flush with the corresponding end of the leg 27, and a flat intermediate or bight portion 26 interconnecting the adjacent or flush end of the legs 27 and 25 of the holder. The leg 27 of each holder 17 is embedded in the material of the band 15 medially of the thickness of the band and extends inwardly of the band from the corresponding edge of the band toward the mid width location thereof, the intermediate portion 26 of the holder extends from the outer end of the leg 27 outwardly of the adjacent edge surface of the band and the leg 25 overlies and is spaced from the outer surface of the band to receive the adjacent end portion of the web 18 of the corresponding cleat 16 between itself and the outer surface of the band.

The holders 17 are arranged in pairs, as indicated at 17 and 17' in Figure 3, with the two holders of each pair disposed at respectively opposite side edges of the band and in alignment with each other transversely of the band. The holders of each pair engage the respectively opposite end portions of the web of the corresponding cleat so that the cleat is secured at both ends to the band 15.

In order to detach a worn cleat from the band and replace it with a new cleat, the two holders engaging the cleat are grasped near their outer ends and pulled apart, stretching the band 15 transversely thereof, until the associated cleat can be removed from the holders. With the holders held apart a new cleat is engaged under the outer legs of the holders and the holders are then released to permit the band to contract and move the holders together and into operative engagement with the replacement cleat.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a traction device for the tread of a tire, a resilient and stretchable circular band of smaller initial diameter than a tire tread, said band having opposite edges, pairs of circumferentially spaced cleat holders around said band, each cleat holder comprising a U-shaped rigid form having a long arm embedded in one of the opposite edges of the band, an intermediate portion projecting from the long arm along the edge of the band, and a shorter arm on said intermediate portion extending crosswise of the band and spaced from the band, the holders of each pair being aligned with each other crosswise of the band and being out of contact with each other, and a cleat associated with each pair of holders, the cleats comprising plates engaging the band and extending thereacross, the plates having ends engaged between the shorter holder arms and the band, and means on the cleats engaging the plates and precluding movement of the plates along the band.

2. In a traction device for the tread of a tire, a resilient and stretchable circular band of smaller initial diameter than a tire tread, said band having opposite edges, pairs of circumferentially spaced cleat holders around said band, each cleat holder comprising a U-shaped rigid form having a long arm embedded in one of the opposite edges of the band, an intermediate portion projecting from the long arm along the edge of the band, and a shorter arm on said intermediate portion extending crosswise of the band and spaced from the band, the holders of each pair being aligned with each other crosswise of the band and being out of contact with each other, and a cleat associated with each pair of holders, the cleats comprising plates engaging the band and extending thereacross, the plates having ends engaged between the shorter holder arms and the band, and means on the cleats engaging the plates and precluding movement of the plates along the band, said means comprising traction flanges projecting from the plates and extending crosswise of the band and engaging opposite sides of the shorter holder arms, said band being stretchable transversely to release the plates from between the shorter holder arms and the band.

References Cited in the file of this patent

UNITED STATES PATENTS

| | | |
|---|---|---|
| 650,907 | Pope | June 5, 1900 |
| 984,499 | Stimpson | Feb. 14, 1911 |
| 2,082,386 | Fritts | June 1, 1937 |